June 24, 1941.  C. C. UTZ  2,246,821
WHEEL SUSPENSION
Filed Feb. 10, 1939   2 Sheets-Sheet 2
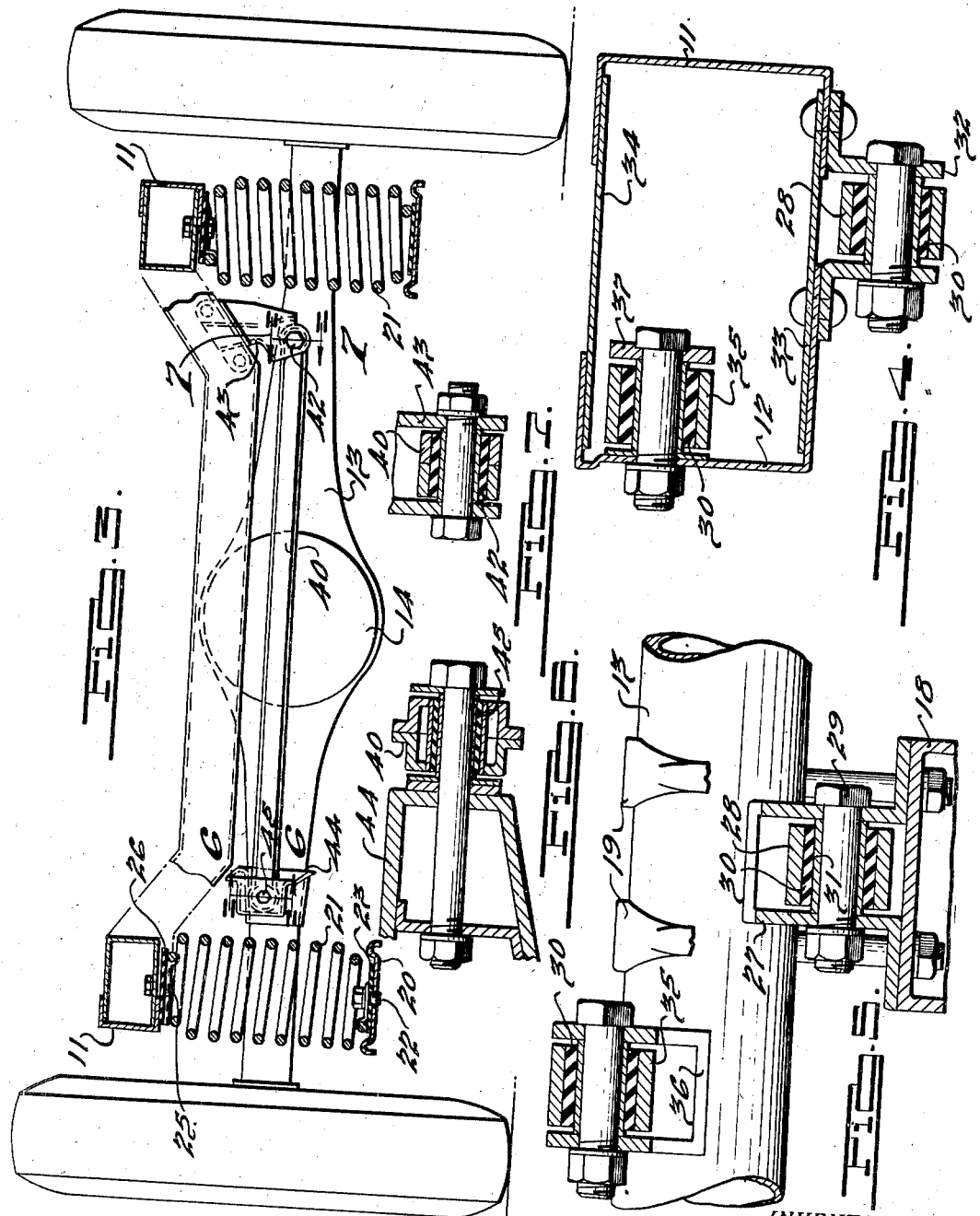
INVENTOR
Chester C. Utz.
BY Harness, Lind, Patee & Harris
ATTORNEYS.

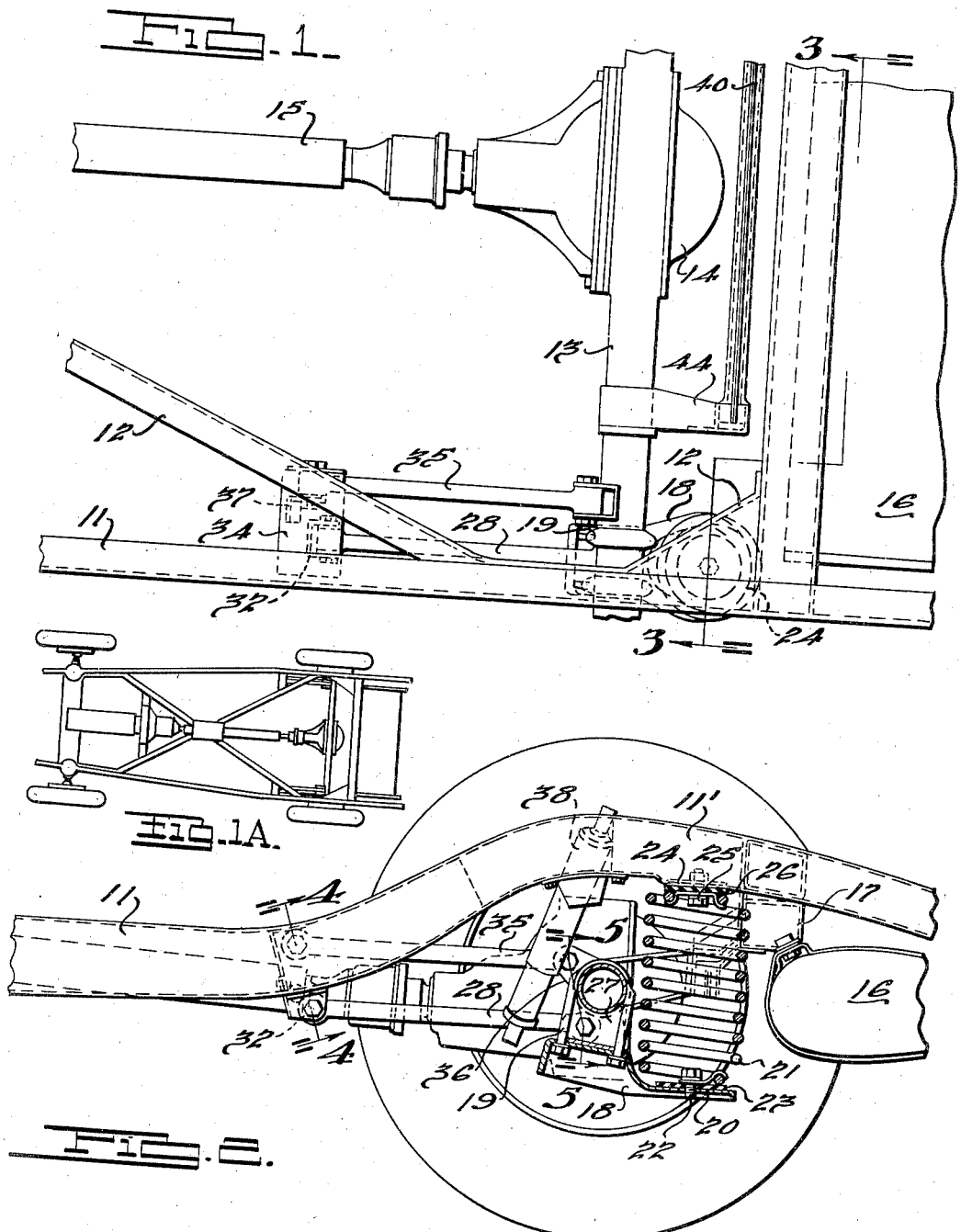

Patented June 24, 1941

2,246,821

UNITED STATES PATENT OFFICE 2,246,821

WHEEL SUSPENSION

Chester C. Utz, Detroit, Mich., assignor to Chrysler Corporation, Highland Park, Mich., a corporation of Delaware Application February 10, 1939, Serial No. 255,576

2 Claims. (Cl. 267—20)

This invention relates to spring suspension for motor vehicles and specifically to improved suspension mechanism for the rear driven axle thereof.

The principal object of the invention is to provide a suspension mechanism for a motor vehicle in which coil springs are used in place of the conventional leaf springs to suspend the driven axle from the frame whereby inter-leaf friction is entirely eliminated.

Another object of the invention is to provide a suspension for the driven axle in which the thrust incident to the driving of the vehicle is transmitted to the frame through a rigid linkage rather than through the springs.

An additional object of the invention is to provide a suspension which possesses the necessary flexibility to impart desirable riding qualities to the vehicle without undesirable "gallop" or "flutter" of the unsprung parts when travelling over rough roads.

A still further object is to provide a suspension for the driven axle which permits rocking movement of said axle without imposing undesirable torsional strains on the housing thereof.

One embodiment of the invention is illustrated in the accompanying drawings in which:

Fig. 1 is a fragmentary plan view of one side of a motor vehicle chassis embodying the suspension, it being understood that the mechanism is duplicated on the other side of the vehicle.

Fig. 1A is a plan view on a reduced scale of the complete vehicle chassis.

Fig. 2 is a side elevation of the motor vehicle chassis shown in Fig. 1.

Fig. 3 is a rear elevation of the chassis of Figs. 1 and 2 along the line 3—3 of Fig. 1.

Fig. 4 is a section along the line 4—4 of Fig. 2.

Fig. 5 is a section along the line 5—5 of Fig. 2.

Fig. 6 is a section along the line 6—6 of Fig. 3.

Fig. 7 is a section along the line 7—7 of Fig. 3.

In the drawings in which similar reference characters designate corresponding parts in the following description, 11 designates a side channel member of the vehicle chassis frame which has the usual kick-up portion 11' over the rear axle and the usual X-brace member 12. The rear driving axle 13 is provided with the usual differential housing 14 which contains a set of differential gears driven by the propeller shaft 15. The vehicle fuel tank 16 is suspended from the frame at the rear end of the vehicle by means of a bracket 17.

A bracket 18 is attached to the axle 13 by means of the U-bolts 19 and is provided with an integral rearwardly extending portion 20 on which a coil spring 21 is supported. A resilient pad 23 is interposed between the lower coil of the spring and the bracket 20 to which the spring is secured by fastening means 22. The spring is secured at the top to the box portion 24 of the chassis frame by means of the fastening means 25, a resilient pad 26 being interposed between the upper coil of the spring and the flange of the chassis frame member as shown in Fig. 2.

The bracket 18 is also provided with a channel-shaped up-right portion 27 (Fig. 5) to which is pivoted by means of a bolt 29 a lower radius arm 28. A resilient sleeve 30 of rubber or similar material is interposed between the arm 28 and the bushing 31 which surrounds bolt 29. Arm 28 is pivoted at its forward end to the bracket 32 which extends downwardly from the chassis frame side member 11 as shown more clearly in Figs. 2 and 4. A resilient connection similar to that just described is provided. The bracket 32 is rigidly supported on a box-like structure formed by the frame members 11 and 12 and the gusset members 33 and 34.

An upper radius arm 35 is pivoted at its rearward end to a bracket 36 formed integrally with the axle 13 and at its forward end to a bracket 37 fastened to one wall of the box structure just described. A pair of resilient sleeves 30 are interposed between their respective brackets and pivoted bolts to provide a resilient connection.

A shock absorber 38 is suitably attached to the frame and axle respectively and assists the spring 21 in cushioning the movement of the axle with respect to the frame.

The mechanism just described is duplicated on the opposite side of the vehicle as indicated by the rear view thereof in Fig. 3.

In order to maintain the frame and axle in alignment, a bar 40 pivoted at one end to the frame mounted bracket 43 and at its other end to the axle mounted bracket 44 is provided. Rubber bushings 42 and 45 are provided to permit some degree of universal movement between the parts.

From the description it will readily be seen that axle 13 forms one side of a parallelogram, the links 28 and 35 forming the two longer sides thereof. As the axle moves upwardly and downwardly during travel of the vehicle, it will also have slight backward and forward movement but because of the parallelogram linkage at each side thereof, there will be no twisting strains set up in the axle housing. Because of the resilient connections between the links 28 and 35 and the axle and frame respectively, rocking movement of said axle will readily be accommodated. By eliminating twisting of the axle during its up and down movement the use of a lighter housing is made possible with consequent economy of manufacture and improvement in the riding qualities of the vehicle due to the reduction in unsprung weight.

Although but one embodiment of my invention is described, it is not desired to limit the same except as set forth in the claims appended hereto.

I claim:

1. In a motor vehicle, the combination of a frame including side sills connected by obliquely disposed brace members; of driving road wheels disposed at opposite sides of said frame; means yieldingly supporting said road wheels for rising and falling movement with respect to said frame, said means comprising an axle housing disposed transversely of said frame and carrying said wheels; spring means supporting said axle on said frame adjacent each wheel; and a pair of parallel links pivotally connected to said axle at each side of the vehicle, each of said pairs of links being connected to said side sills and said brace members at points adjacent the connection of said brace members to said sills.

2. In a motor vehicle, a frame having side sills, means for reinforcing said frame comprising brace members connected between said sills and disposed obliquely relatively thereto, additional brace members connecting said sills and said first named brace members at points adjacent the connection between said first named brace members and said sills to form a rigid box-like structure at each side of the vehicle, an axle yieldably connected to said frame, means for guiding said axle for rising and falling movement relatively to the frame including a pair of links disposed in parallelism at each side of the vehicle and pivoted at one end thereof to said axle, and means carried by said box-like structures for pivotally connecting the opposite ends of said links to said frame.

CHESTER C. UTZ.